United States Patent [19]
Hirsch

[11] 3,961,699
[45] June 8, 1976

[54] AUTOMATIC GARMENT HANGER DISPENSER AND HANGERING DEVICE

[76] Inventor: Gary Marc Hirsch, 1931 NE. 187 Drive, North Miami Beach, Fla. 33179

[22] Filed: July 12, 1974

[21] Appl. No.: 488,046

[52] U.S. Cl. .............................. 198/26; 198/177 R; 198/232
[51] Int. Cl.² ........................................ B65G 47/00
[58] Field of Search ............. 198/25, 26, 160, 162, 198/167, 232, 177 T, 177 R

[56] References Cited
UNITED STATES PATENTS

| | | | |
|---|---|---|---|
| 1,645,315 | 10/1927 | Bixler et al. .......................... | 198/26 |
| 1,944,734 | 1/1934 | Dupuy ............................. | 198/232 X |
| 2,318,180 | 5/1943 | Morse ................................... | 198/26 |
| 2,796,165 | 6/1957 | Carr .................................... | 198/26 |
| 3,580,378 | 5/1971 | Pedersen .............................. | 198/25 |
| 3,620,354 | 11/1971 | McMillan ........................ | 198/177 T |
| 3,799,318 | 3/1974 | Dekoekkoeh ......................... | 198/38 |

Primary Examiner—Robert J. Spar
Assistant Examiner—James M. Slattery
Attorney, Agent, or Firm—Gustave Miller

[57] ABSTRACT

This is an automatic garment hanger dispenser and hangering device for use in laundries for cleaning commercial garments and shirts that must be placed on hangers and then be passed through a cleaning "tunnel" on a conveyer suspending and transporting the hangered shirt or garment therethrough. Prior to this device, the operator could drape about one hundred seventy-five to two hundred shirts or garments on hangers per hour, but with this device, the same operator averages about four hundred to four hundred fifty hangered shirts or garments.

9 Claims, 10 Drawing Figures

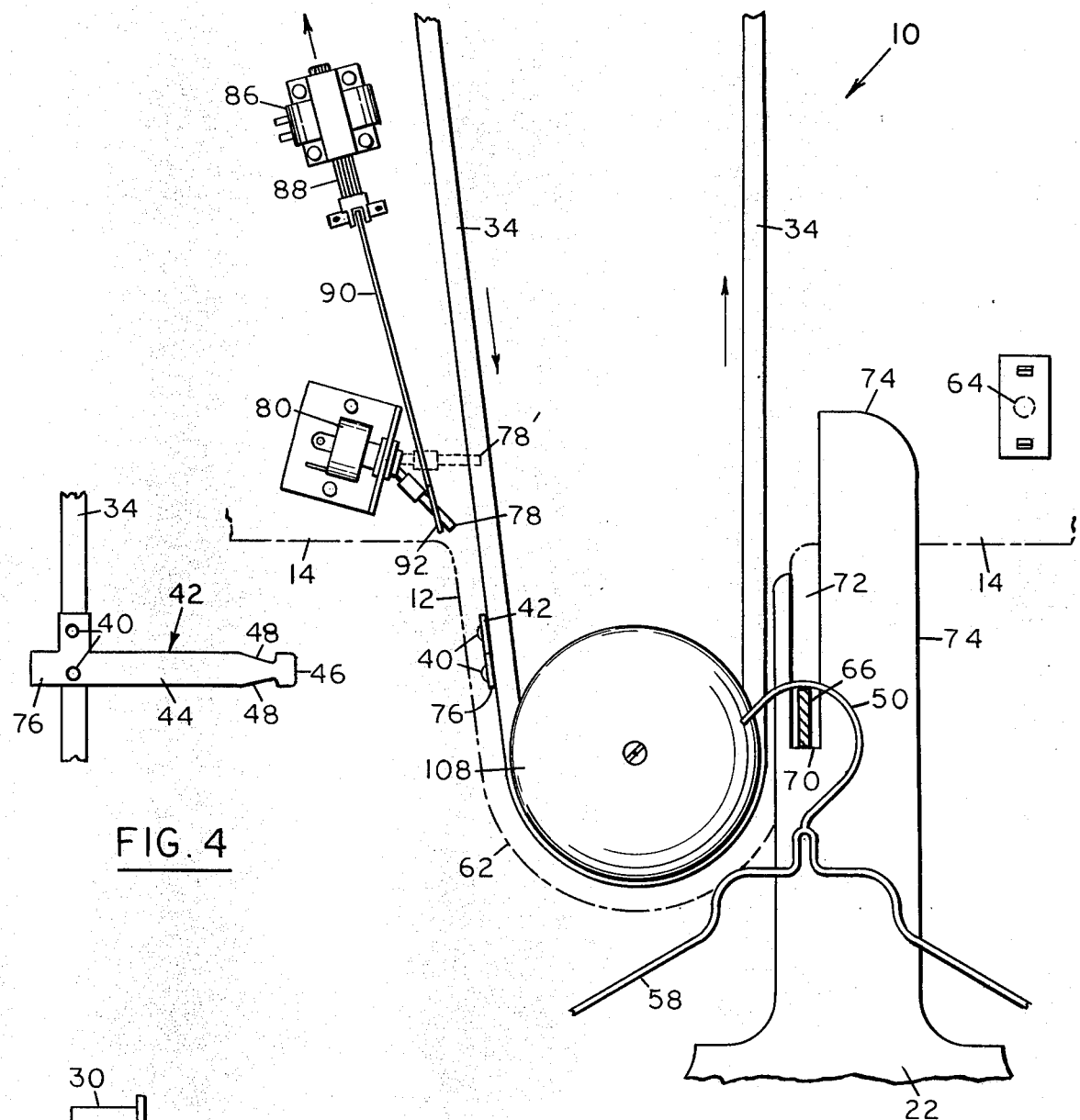
FIG. 4
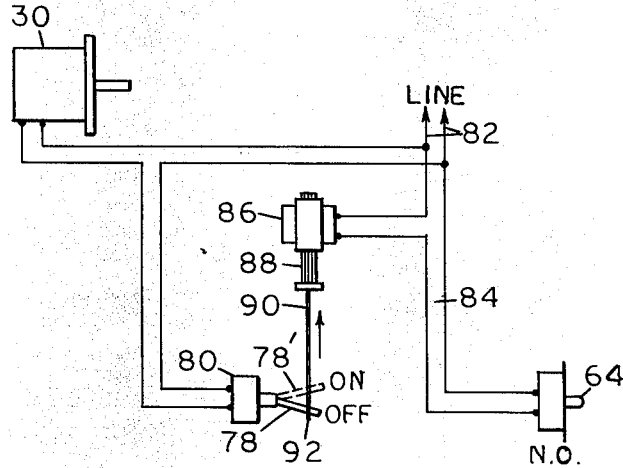
FIG. 3
FIG. 5

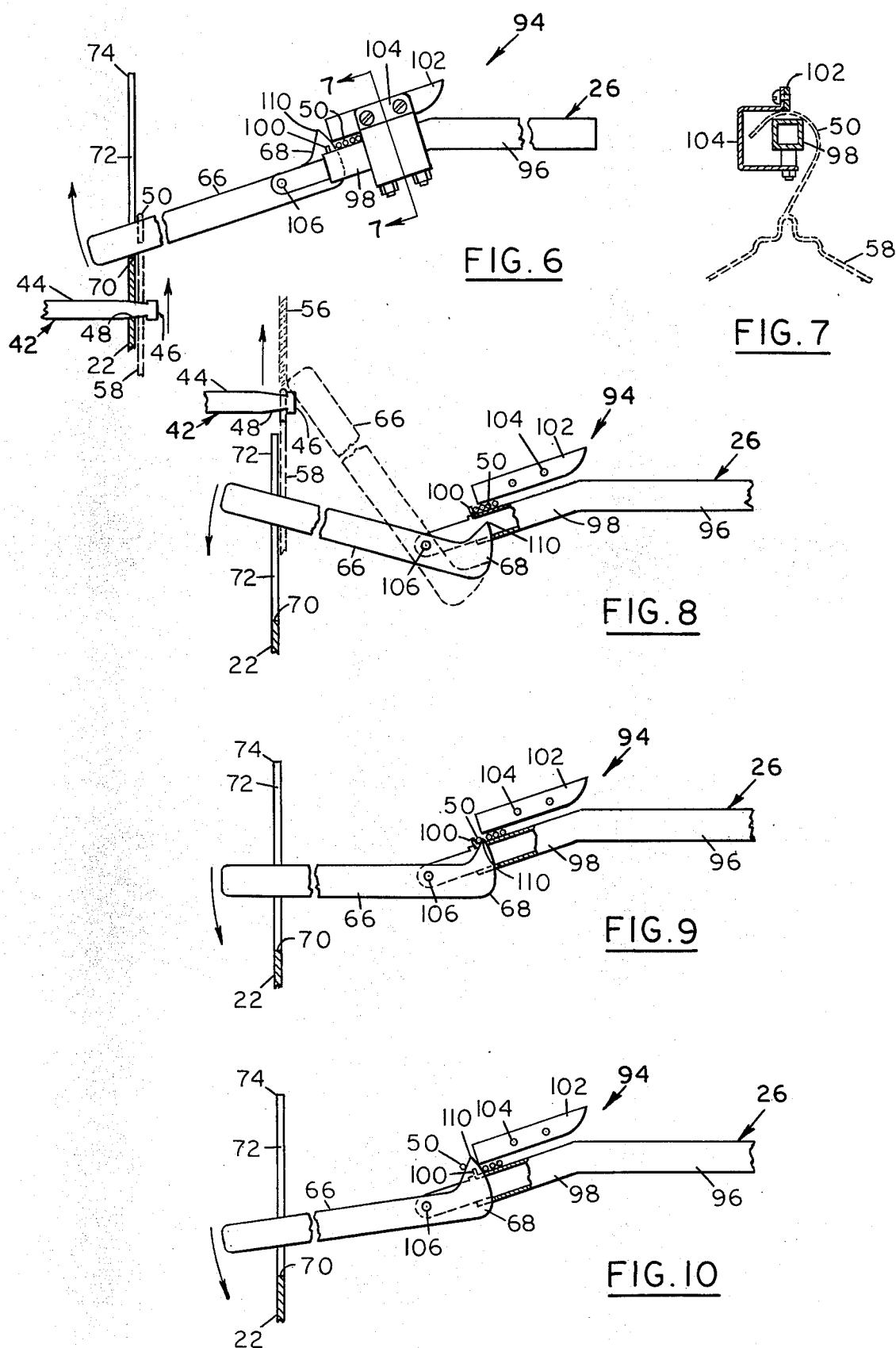

AUTOMATIC GARMENT HANGER DISPENSER AND HANGERING DEVICE

SUMMARY OF THE INVENTION

In this device, garment hanger hooks are suspended on a straight section of a hanger dispenser of this invention from which a slope arm section depends, the slope arm section holding about thirty hangers. The hangers feed down the slope arm by gravity to a stop near its lower end, and, supported above the slope arm a distance far enough to permit the hanger hooks to just pass freely thereunder, is a guide bar ending a hanger hook width from the stop on the slope arm. A J-hook leg is pivoted adjacent its J-hook point end on the lower end of the slope arm so that when the hook point moves up, as the longer leg portion moves down, the hook point end just clears the guide bar end but it is a hanger hook thickness spaced above the stop on the slope arm. As a result, when the J-hook is pivoted, the point will pick up the downmost hook on the slope arm, which will then slide down the J-leg, coming to rest on the bottom of a slot at the top of a shirt or garment draping plate. While the hanger is in this position, the operator may drape a garment over the draping plate and the hanger resting thereagainst.

A motor operated endless belt has a hanger hook pick-up finger secured transversely thereon, the draped hanger being supported adjacent a lower belt pulley in the path of this pick-up finger, which will pick it up and lift up the hanger and garment to the upper pulley, where there is a drop off angled rod whose end intercepts the path of the hook of the draped hanger and causes it to slide down such rod, leading to a screw conveyor, which takes the draped hanger to and through the cleaning "tunnel".

The pick-up finger is secured to extend across the belt, and the extending portion trips a conventional motor cut-off switch and brake to stop the pick-up finger before it reaches the draped hanger position. A solonoid lifts the motor switch to motor operating position when a switch button is manually actuated by the operator after the operator has completed draping the next garment on the hanger to cause the next draped hanger to go through the same cycle.

BACKGROUND OF THIS INVENTION

Commercial laundries for cleaning commercial uniform garments and shirts for commercial use have developed a cleaning "tunnel", through which a hangered shirt or garment is to be laundered passes on a screw conveyor. Prior to this invention, the shirts and garments were placed on the hangers by an operator manually, picking up a hanger and garment, draping the garment on the hanger held in one hande and then placing the hanger hook on the endless conveyor manually. Most operators average about one hundred seventy-five draped hangers per hour.

OBJECTS OF THE INVENTION

It is an object of this invention to provide an automatic hanger dispenser and hangering device which will enable one operator to more than double her production.

A further object of this invention is to provide a device that will automatically dispense a hanger to a hangering position, where an operator may manually drape a garment thereon, and then actuate a switch to cause the garment draped hanger to be picked up and placed on a conveyor and then cause a new hanger to be placed in the hangering position.

Still a further object of this invention is to provide means for speeding up the hangering of commercial garments for laundering.

BRIEF DESCRIPTION OF THE FIGURES

With the foregoing and other objects in view, this invention comprises the combination, construction and arrangement of parts hereinafter set forth, claimed and disclosed in the accompanying drawings, wherein:

FIG. 3 is an enlarged fragmentary view of the middle portion of FIG. 1.

FIG. 4 is an enlarged fragmentary view showing the belt carried hanger pick-up hook and slave switch actuating transverse end.

FIG. 5 is a schematic of the circuits.

FIG. 6 is a view of the dispenser with the hook leg supported in hanger hook pick-up position.

FIG. 7 is a section on line 7—7 of FIG. 6.

FIG. 8 is a view similar to FIG. 6 just after the hanger hook has been picked up, and in phantom, when the lifted drape hanger garment in abutting the J-hook leg and holding it in upmost position.

FIG. 9 is the next sequence to FIG. 8, with the J-hook point just separating the downmost hanger hook from the next hook on the slope arm.

FIG. 10 is the next sequence of FIG. 9, with the downmost hanger hook just sliding down the J-hook point end as the hook leg pivots down toward the position shown in FIG. 6.

Figures 1, 2:
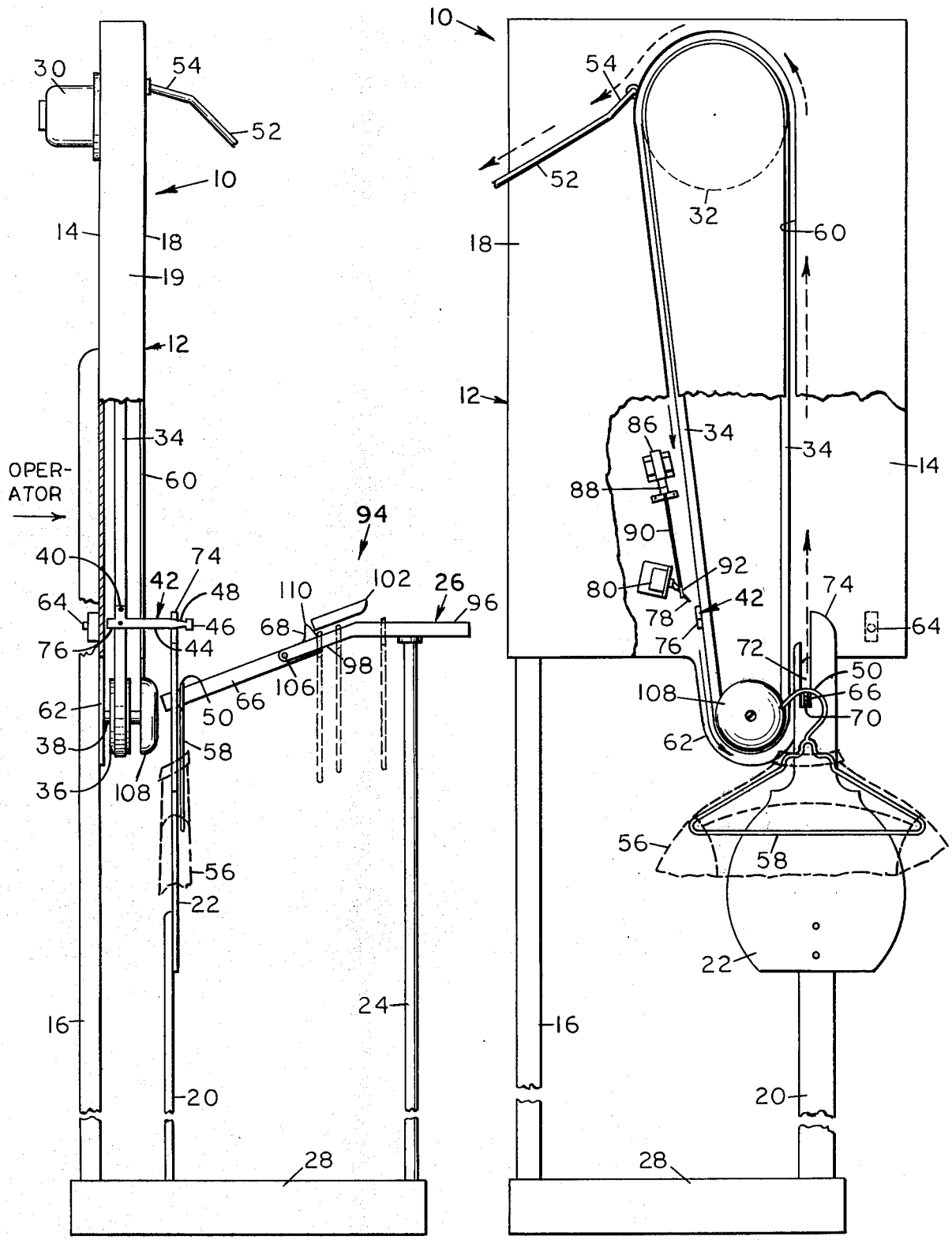
FIG. 1 is a front view of the garment hangering device of this invention showing the opposite side to the side which the operator faces.
FIG. 2 is a left side view of FIG. 1.

There is shown at 10 the automatic garment hanger dispenser and hangering device 10 of this invention. This device 10 includes an upstanding framework 12 having a front wall 14 supported on a pair of upright standards 16. A back wall 18 is secured by side walls 19 on the front wall 14. Another standard 20 supports a draping plate 22 in proper position behind and below wall 18, and still further back another standard 24 supports a hangering arm 26. All the standards 16, 20 and 24 are fixed on a rectangular base 28 which thus supports the entire device 10.

Mounted on the framework 12 is a conventional motor 30 of the type that includes a brake for stopping it quickly once the power is shut off. The shaft of motor 30 extends through front wall 14 and rotatably supports an upper pulley 32 between walls 14 and 18. A flat-sided endless V belt 34 extends between and is rotated by the upper pulley 32, and a lower pulley 36 journaled on a shaft 38 fixed in front wall 14.

Securely fastened to the flat side of endless V belt 34 at 10 is a hanger hook flat pick-up finger 42. This pickup finger 42 has a long pick-up portion 44 terminating in pick-up end 46 having recesses 48 on its opposite sides adjacent its end 46, the recesses 48 receiving a hanger hook 50 thereon to prevent the hanger hook 50 from accidentally dropping off, but permitting the hanger hook 50 to be readily picked off by a drop-off rod 52 having a pick-up end 54 supported in the upper path of the pick-up finger portion 44 as it passes over the upper pulley 32. The drop-off 52 rod leads down to a screw conveyor (not shown) which takes the hanger hook 50 with a garment 56 draped on its hanger 58. The front wall is provided with a slot 60 through which the pick-up finger 42 travels, the slot 60 continuing through a back wall lower extension 62 on which a flat bell-shaped deflector 108 is supported to prevent the garment 56, and particularly its pocket, from catching on any of the mechanism.

A motor starting switch button 64 is located on the back of back wall 16 convenient to the operator when she has draped a garment 56 on about the draping plate 22 and the stationary hanger 58 supported on a sloping leg 66 of a pivoted J-hook 68. In this position, the sloping J-hook leg 66 is supported on the bottom 70 of a slot 72 in an upper extending arm 74 of the draping plate 22.

The pick-up finger 42 has a motor disconnect portion 76 extending across the belt 34, and this disconnect portion 76 will hit a switch finger 78 of motor actuating slave switch 80, to move if from the "ON" position to the "OFF" position as seen in FIG. 5.

Referring to FIG. 5, the motor 30 is connected to the power line 82 through the slave toggle switch 80. When the operator's start switch 64, which is normally open unless held depressed, is depressed, the circuit 84 actuates a solenoid 86, whose armature 88 has a rod 90 pivotally connected thereto, and this armature 90 ends in a loop 92 extending about motor actuating slave toggle switch finger 78, as shown in FIGS. 3 and 5. When the starting switch 64 is momentarily depressed, the armature rod loop 92 lifts the slave toggle switch finger 78 from its "OFF" or circuit braking position 78 to its "ON" position 78'. This causes the motor to rotate the endless belt 34, causing the pick-up finger 42 to travel from the position shown in FIG. 2, down around the lower pulley 38 and past the hanger hook pick-up portion, up to the drop-off rod 52 and around pulley 32 and down to have its motor switch stopping portion 76 hit the slave switch toggle in "ON" position 78' and move it to the "OFF" position 78, stopping the motor 30 with the pick-up finger in the position shown in FIG. 3. When the start switch 64 is momentarily then depressed, the cycle is repeated, motor 30 is restarted, and finger 42 travels in its path around with the endless belt, picking up and dropping off the hanger hook 50 as it does so, to again stop the motor.

Next, the operation of the hanger dispenser 94, shown generally to FIGS. 6 through 10 inclusive, is set forth. The hangering arm 26 of hanger dispenser 94 has a level arm portion 96 and a slope arm portion 96 and, from time to time, as needed, a number of hangers are pushed down onto the slope arm portion 98, where they descend by gravity until the bottom most hook hanger hook 50 abuts a stop member 100. A guide bar 102 is supported at 104 a distance above slope arm 98 just enough to let the hanger hooks slide down thereon, until the bottom most hook 50 abuts the stop 100. The lowermost end of guide bar 102 is spaced from stop 100 just enough to let only one hook 50 to be lifted over stop 100 by the J-hook point 110 as it is pivoted at 106 and the J-hook leg 66 moves from the position 66' in FIG. 8 to where the J-hook leg 66 abuts the bottom 70 of slot 72.

When the J-leg 66 is resting on the bottom 70 of slot 72, the hook 50 and its hanger 58 are resting against the garment draping plate 22. The operator then manually drapes a garment 54 over the draping plate 22, thus simultaneously drawing the garment over the hanger 58 in abutting position. If there is a pocket on the left side of the garment in the customary position, it will be aligned just below the flat bell-shaped deflector 108 mounted on the lower extension 62 of wall 18. As soon as the operator finishes draping the garment over the draping plate 22 and hanger 58 thereagainst, she lifts her right hand to depress the normally open switch 64, completing the circuit 84 to actuate the solenoid 86 and drawing the armature 88 upwardly to lift rod 90 and its loop 92 to move the motor control slave switch 78 from the "OFF" position to the "ON" position. This causes the motor 30 to operate the endless belt 34, and the motor 30 continues to operate until the pick-up finger motor disconnect portion 76 completes one cycle of operation and abuts slave switch finger 78 to move it from the position at 78' in FIG. 3 to the motor stopping position at 78, the stopping action being caused by the conventional brake present in this conventional brake and motor.

As the belt 34 rotates through one cycle, the garment pick-up finger portion 44 passes up under the hanger hook 50 of the garment draped hanger 68 supported on J-leg 66 at the bottom 70 of slot 72, as shown in FIG. 3, is carried up by the belt 34, the hanger and draped garment 54 lifting up the J-leg 66 to the position shown in phantom in FIG. 8, the deflector 108 preventing the garment pocket from catching on any part of the mechanism. When the garment 54 is lifted up on the hanger 58 on the pick-up finger 42 to travel over the upper pulley, the path of its hook 50 intercepts the end 54 of drop-off rod 52, causing the garment draped hanger 58 to have its hood 50 slide down the drop-off rod and 52 to its spiral conveyor (not shown) to be carried away.

Meantime, when the hanger and its draped garment has been lifted to pass the J-leg as shown in Phantom in FIG. 8, the J-leg 66 drops down to the bottom 70 of slot 72 again. As it does so, the point 100 of J-hook 68 moves as shown in FIG. 8, then FIG. 9, to pick up the bottom-most hanger hook 50 on slope arm 98, lift it over the stop 100, as in FIG. 10, so that it then slides down the J-leg 66 to abut the draping plate 22 as the J-leg 66 is supported on bottom 70 of slot 72, whereupon the operator draws another garment thereon and actuates switch 64 to commence a new cycle.

In operation, it is found that the operator can perform this operation about 450 times an hour, compared to about 150 times an hour without the use of this hangering invention.

ABSTRACT OF THE DRAWINGS

In the drawings, like numbers refer to like parts, and for the purposes of explication, marshaled below are the numbered parts of the improved Automatic Garment Hanger Dispenser and Hangering Device.

|    |                                                      | In Figures: |
|----|------------------------------------------------------|-------------|
| 10 | Automatic garment hanger dispenser and hangering device | |
| 12 | Framework                                            | 1,2,3       |
| 14 | Front wall                                           | 1,2,3       |
| 16 | Pair of front wall supporting standards              | 1, 2        |

| | | |
|---|---|---|
| 18 | Back wall | 1, 2 |
| 19 | Side wall | 2 |
| 20 | Standard, supporting 22 | 1, 2 |
| 22 | Garment draping plate | 1, 2, 3, 6, 8, 9, 10 |
| 24 | Standard, supporting 26 | 2 |
| 26 | Hangering arm | 2, 6, 8, 9, 10 |
| 28 | Rectangular base | 1, 2 |
| 30 | Conventional brake type motor | 2, 5 |
| 32 | Upper pulley | 1 |
| 34 | V endless belt | 1, 2, 3, 4 |
| 36 | Lower pulley | 2 |
| 38 | Shaft for 36 | 2 |
| 40 | Fastening of 42 to 34 | 2, 3, 4 |
| 42 | Pick-up finger | 1, 2, 3, 4, 6, 8 |
| 44 | Long pick-up portion of 42 | 2, 4, 6, 8 |
| 46 | End of 44 | 2, 4, 6, 8 |
| 48 | Hanger hook pick-up recesses in 42 adjacent 46 | 2, 4, 6, 8 |
| 50 | Hanger hook | 1, 2, 3, 6 thru 10 |
| 52 | Drop-off rod | 1, 2 |
| 54 | Drop-off rod hanger hook intercepting end | 1, 2 |
| 56 | Garment | 1, 2, 6, 7 |
| 58 | Hanger | 1, 2, 3, 6, 7, 8 |
| 60 | Slot in back wall 18 through which 42 extends | 1, 2 |
| 62 | Lower extension of wall 14 | 1, 2, 3 |
| 64 | Operator's motor starting switch button | 1, 2, 3, 5 |
| 66 | J-hook leg | 1, 2, 3, 6, 8, 9, 10 |
| 68 | J-hook | 1, 2, 6, 8, 9, 10 |
| 70 | Bottom of slot 72 in 74 of 22 | 1, 3, 6, 8, 9, 10 |
| 72 | Slot in 74 of 22 in which 66 moves up and down | 1, 3, 6, 8, 9, 10 |
| 74 | Upper extending arm of 22 | 1, 2, 3, 6, 8, 9, 10 |
| 76 | Opposite extending end of 42 activing 78 to disconnect motor 30 | 1, 2, 3, 4 |
| 78 | Toggle /Switch finger of 80 in "OFF" position | 1, 3, 5 |
| 78' | Toggle /Switch finger of 80 in "ON" position | 3, 5 |
| 80 | Motor operating slave toggle /switch | 1, 3, 5 |
| 82 | Power line | 5 |
| 84 | Solenoid operating circuit | 5 |
| 86 | Solenoid | 1, 3, 5 |
| 88 | Solenoid armature | 1, 3, 5 |
| 90 | Switch lifting rod on 88 | 1, 3, 5 |
| 92 | Switch lifting loop at end of 90 | 1, 3, 5 |
| 94 | Hanger dispenser | 2, 6, 8, 9, 10 |
| 96 | Level arm portion of 26 | 2, 6, 8, 9, 10 |
| 98 | Slope arm portion of 26 | 2, 6, 7, 8, 9, 10 |
| 100 | Stop member on 98 | 6, 8, 9, 10 |
| 102 | Guide bar | 2, 6, 7, 8, 9, 10 |
| 104 | Support for 102 | 6, 7, 8, 9, 10 |
| 106 | Pivot for J-hook 68 | 2, 6, 8, 9, 10 |
| 108 | Flat bell-shaped deflector on 62 | 1, 2, 3 |
| 110 | Point of J-hook 68 | 2, 6, 8, 9, 10 |

While the device has been shown and the structure described in detail, it is obvious that this invention is not to be considered as being limited to the exact form disclosed and changes in detail and construction may be made therein within the scope of what is claimed, without departing from the spirit of this invention.

Having thus set forth and disclosed the nature of this invention, what is claimed is:

1. A garment (56) hanger (58) dispensing (94) and hangering (94) device (10) comprising a downward angularly extending hanger hook (50) dispenser slope arm (98), a hanger hook guide bar (102) spaced and supported (104) thereabove a distance at least slightly greater than the thickness of a hanger hook (50) to be dispensed thereby, a hanger hook stop means (100) on said slope arm (98) spaced from the downward end of said hanger hook guide bar (102) a distance approximately the thickness of a hanger hook (50), a J-shaped hook leg (66) pivoted (106) on said dispenser slope arm (98) downwardly of said stop means (100), said leg (66) having an upper end J-hook point (110) pivoting (106) to just clear the downward end of said guide bar (102) and thus extend up just beyond the downmost hanger hook (50) on said slope arm (98) to lift such downmost hanger hook (50) over said stop means (100) to then slide downwardly on said J-hook leg (66), means (70, 72, 74) limiting the downward pivoting movement of said J-hook leg (66) and the downward slide movement of said downmost hanger hook (50) thereon and supporting (70) said J-hook leg and hanger hook thereon in such downward position while a garment (54) may be manually draped on the hanger thereon, an endless belt (34), an upper pulley (32) and a lower pulley (36) on which said endless belt is rotatably mounted, a motor and motor brake (30) operatively connected to one of said pulleys, support means (12) on which said motor and pulleys are mounted, a hanger hook to long rigid pick-up finger (42) fixedly secured on and extending transversely of said endless belt (34) and operable by said endless belt in a path intercepting the hanger hook of said garment draped hanger adjacent said lower pulley, the draped garment and hanger abutting the downwardly extending J-hook leg and lifting and holding said J-hook leg (66) up until the draped garment and hanger pass up thereby to then release said leg (66) to pivot down and cause its J-hook (68) end point (110) to pick up a further hanger hook from said slope arm, a hanger hook interception drop-off means (52, 54) adjacent said upper pulley (32) in the path of the garment draped hanger and hanger hook, a manually operable normally open switch (64) mounted on said support means (14) adjacent the garment draping position (74), a motor actuating solenoid (86), a slave toggle switch (80) connected to said solenoid (86) and initiated into action by said manually operable switch (64), a toggle switch controlling arm

(78) of said slave switch extending into the downward path of said hanger hook pick-up means to stop operation of said belt rotating motor at the end of one cycle, and means connecting said solenoid (86) to said slave switch arm (78) comprising a rod (90) pivotally connected to the armature (88) of said solenoid and having a closed loop (92) extending about said slave switch arm (78).

2. The device of claim 1, said hook-leg downward pivoting limiting means comprising a slot (70) and its bottom (72) in an upwardly extending arm (74) of a garment draping plate (22), the garment (56) being draped over the hanger (58) and about said garment draping plate (22).

3. The device of claim 2, and a garment deflector (108) mounted on said support means (12) forward of said lower pulley (36) and rearwardly of said slotted garment draping plate (22) to deflect the draped garment (56) away from said lower pulley (36) as it is being lifted by said hanger pick-up means (42) on said endless belt (34).

4. The device of claim 3, said garment deflector plate (108) being in the shape of a flattened circular bell to deflect a garment pocket passing thereover.

5. The device of claim 1, said finger being recessed (48) adjacent its end (46) to carry the hanger hook (58) thereon.

6. The device of claim 1, said long finger (44) being substantially flat and recessed on its opposite flat edges adjacent its end (46).

7. The device of claim 1, said finger (44) having an oppositely extending end (76), said switch arm (78) of said slave switch (80) being in the path of said finger opposite end (76) and adjacent the position of said lower pulley (36) to be moved from "ON" position (78') to "OFF" (78) as said finger oppositely extending end (76) passes thereby.

8. The device of claim 1, and a framework (12) providing said support means for said motor (30), for said pulleys (32, 36), for said draping plate (22, 74) and for said hanger dispenser (94).

9. In a garment hanger (58) dispensing and hangering (94) device (10), a downwardly angular extending pivoted hanger receiving leg (66) adapted to receive and temporarily support a garment (56) on a hanger (58) having a hanger hook (50) thereon, means (70) limiting the downward pivoting movement of said hanger receiving leg (66), an endless belt (34), an upper pulley (32) and a lower pulley (36) on which said endless belt is rotatably counted, a motor (30) operatively connected to one of said pulleys, support means (12) on which said motor and pulleys are mounted, a hanger hook rigid pick-up finger (42) fixedly secured on and extending transversely of said endless belt (34) and operable by said belt in a path intercepting the hanger hook (50) of said garment draped hanger temporarily supported on said leg (66) adjacent said lower pulley, the draped garment (56) and hanger abutting said hanger supporting leg (66) and lifting and holding said leg up until the hanger and draped garment pass upwardly thereby to then release said leg down to the hanger receiving position for a next hanger, a hanger hook intercepting drop-off means (52,54) located adjacent said upper pulley in the path of the garment draped hanger and hanger hook temporarily supported on said rigid finger on said belt, a motor actuating solenoid (86), a slave toggle switch (80) connected to said solenoid (86) and initiated into action by a manually operable switch (64) mounted on said support means (12), a toggle switch controlling arm (78) of said slave switch (80) extending into the downward path of said hanger hook rigid pick-up finger (42) to stop operation of said belt rotating motor at the end of one cycle, and means connecting said solenoid (86) to said slave switch arm (78) comprising a rod (90) pivotally connected to the armature (88) of said solenoid and having a closed loop (92) extending about said slave switch arm (78).

* * * * *